United States Patent [19]

Tsuchiya

[11] Patent Number: 5,459,620
[45] Date of Patent: Oct. 17, 1995

[54] DIAGNOSTIC SYSTEM OF MAGNETIC RECORDING CHANNEL AND MAGNETIC DISK DRIVE APPARATUS

[75] Inventor: Reijiro Tsuchiya, Sagamihara, Japan

[73] Assignee: Hitachi, Ltd., Tokyo, Japan

[21] Appl. No.: 286,250

[22] Filed: Aug. 8, 1994

Related U.S. Application Data

[63] Continuation of Ser. No. 799,140, Nov. 27, 1991, abandoned.

[30] Foreign Application Priority Data

Nov. 30, 1990 [JP] Japan .................. 2-337078

[51] Int. Cl.$^6$ .................................................. G11B 5/09
[52] U.S. Cl. .................................................. 360/51
[58] Field of Search ................... 360/51, 45, 42, 360/40, 26, 46, 65, 53; 369/60

[56] References Cited

U.S. PATENT DOCUMENTS

| | | | |
|---|---|---|---|
| 3,689,903 | 9/1972 | Agrawala et al. | 360/51 |
| 4,394,695 | 7/1983 | Mahon | 360/51 |
| 4,520,408 | 5/1985 | Velasquez | 360/51 |
| 4,644,424 | 2/1987 | Nishiyama et al. | 360/65 |
| 4,651,236 | 3/1987 | Ouchi et al. | 360/45 |
| 4,672,483 | 6/1987 | Kawada | 360/51 |
| 4,724,493 | 2/1988 | Nakamura | 360/51 |
| 4,811,125 | 3/1989 | Sengoky | 360/51 |
| 4,819,103 | 4/1989 | Okamura | 360/51 |
| 4,908,722 | 3/1990 | Sonobe | 360/46 |
| 5,089,821 | 2/1992 | Mori | 360/51 X |
| 5,220,466 | 6/1993 | Coker et al. | 360/51 X |
| 5,255,128 | 10/1993 | Inoue et al. | 360/46 X |

FOREIGN PATENT DOCUMENTS

| | | | |
|---|---|---|---|
| 370422 | 5/1990 | European Pat. Off. | 360/46 |
| 58-185006 | 10/1983 | Japan . | |
| 59-77608 | 5/1984 | Japan . | |

OTHER PUBLICATIONS

Patent Abstracts of Japan, Abstract of Japanese Application No. 59-77608, vol. 8, No. 188 (P-297) (1625), Aug. 29, 1984.
Patent Abstracts of Japan, Abstract of Japanese Application No. 58-185006, vol. 8, No. 31 (P-253) (1468), Feb. 9, 1984.
IBM Technical Disclosure Bulletin, "Data Shift Sampling Device", vol. 28, No. 5, Oct., 1985, pp. 2082-2083.
Proceedings of SPIE—The International Society for Optical Engineering, "Optical Mass Data Storage II", vol. 695, Aug. 18-22, 1986, pp. 306-309.
Electronics, "Solving the Test Problem in SCSI Disk Drives", vol. 59, No. 7, Feb. 1986, pp. 35-37.

*Primary Examiner*—Donald Hajec
*Assistant Examiner*—Thien Minh Le
*Attorney, Agent, or Firm*—Fay, Sharpe, Beall, Fagan, Minnich & McKee

[57] ABSTRACT

An evaluation system for a signal waveform includes a first delay element for delaying a clock signal, a second delay element for delaying the output of the first delay element, and third and fourth delay elements for delaying the output of the second delay element. A first detector receives the output of the first delay element and the signal waveform for outputting binary data, a second detector receives the output of the second delay element and the signal waveform for outputting binary data, a third detector receives the output of the third delay element and the signal waveform for outputting binary data, and first, second and third shift registers receive output data of the first, second and third detectors and the output of the fourth delay element. A comparator unit compares data in the first, second and third shift register with a particular data pattern, and a counter counts output pulses of the comparator unit, the output of the second detector being output as a read data output. The distribution of peak pulses in a detection window is thereby determined.

5 Claims, 13 Drawing Sheets

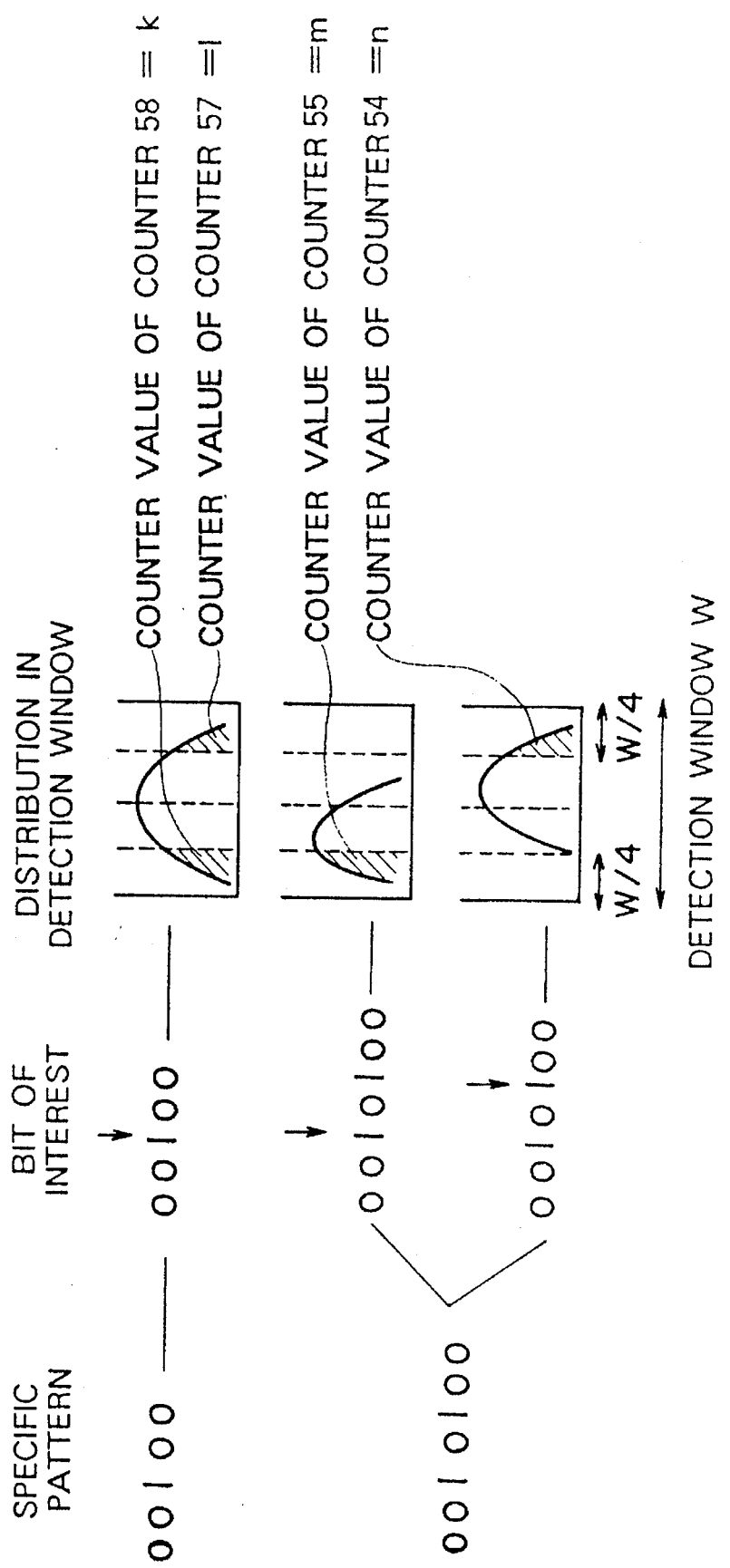

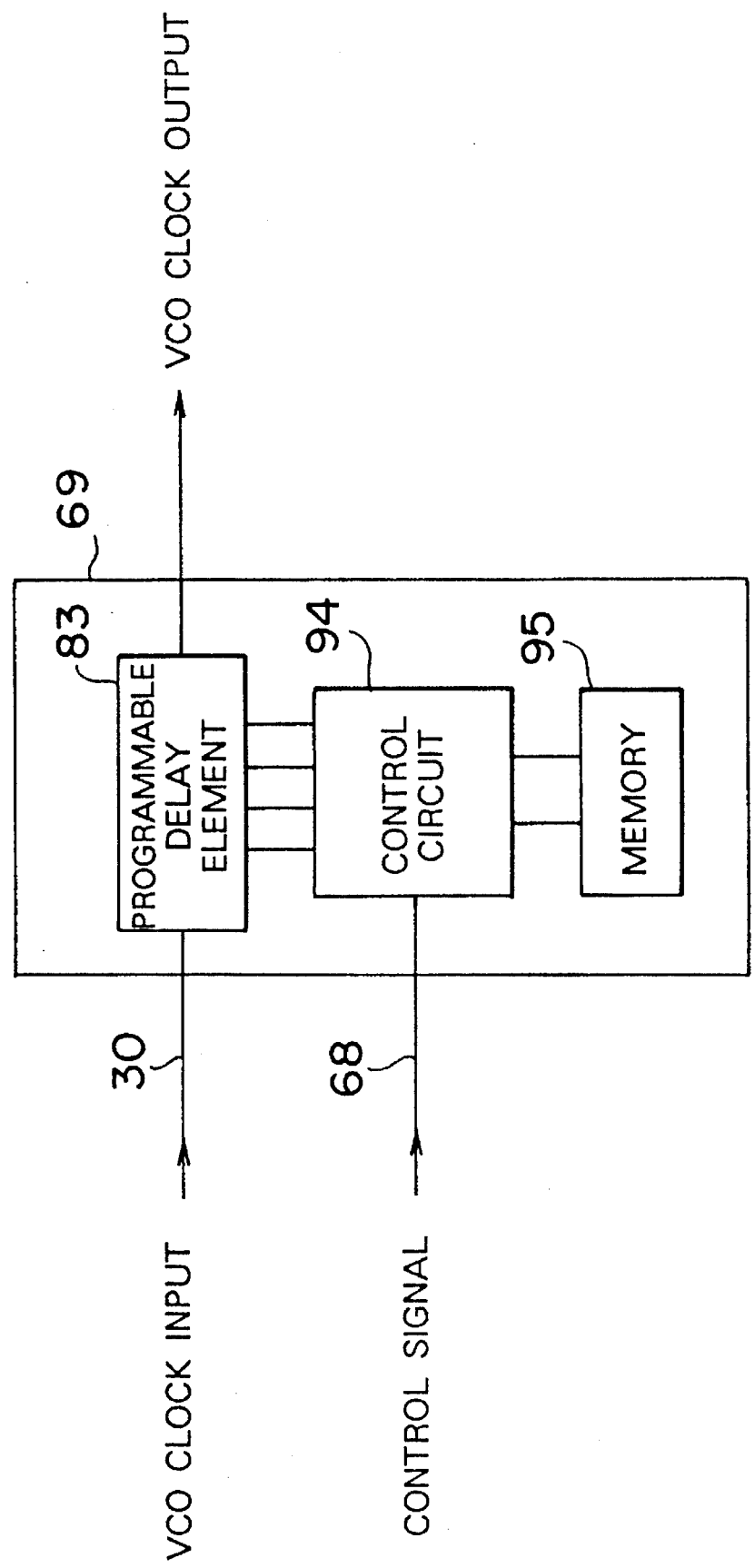

5,459,620

1

DIAGNOSTIC SYSTEM OF MAGNETIC RECORDING CHANNEL AND MAGNETIC DISK DRIVE APPARATUS

This is a continuation of U.S. application Ser. No. 07/799,140, filed Nov. 27, 1991, now abandoned.

BACKGROUND OF THE INVENTION

The present invention relates to a magnetic disk drive apparatus. More particularly, the invention relates to a diagnostic circuit for setting conditions of a magnetic recording system (channel), such as an equalizer, and a magnetic disk drive apparatus which automatically optimizes a signal processing system.

FIG. 2 shows one example of recording and reproducing channels in a magnetic disk drive apparatus. Information to be recorded is converted into a proper code format, such as NRZ-I code, suitable for magnetic recording by an encoder 18. Subsequently, the encoded information is fed to a write amplifier 20 via a recording compensation circuit 19. The write amplifier 20 then converts the information into a recording current waveform. The recording current is converted into a recording magnetic field by means of a recording magnetic head 21 for causing or not causing magnetization reversal on a recording medium 22 and thus recording information respectively corresponding to "1" or "0". In the reproducing process, the magnetic head 21 detects magnetic flux leaking from the magnetization reversal portion on the recording medium, i.e., magnetic disk to convert it into an electric signal. In case of an induction type magnetic head, peaks appear in the converted electric signal corresponding to recorded codes "1". This signal is fed to a pulse generation circuit 27 through an amplifier 23, an automatic gain controlled (AGC) amplifier 24, a waveform equalizer 25 and a differentiation circuit 26. The pulse generation circuit 27 converts the signal thus received into a peak pulse on a line 28. The peak pulse is compared with a VCO clock on a line 30 from a VFO circuit 29 by a detector 31 and thus converted into a binary signal. Then, the binary signal is decoded by a decoder 32 into an original information format.

In such a magnetic recording channel, the recording compensation circuit 19 and the equalizer 25 are provided for compensating nonlineality and high-frequency attenuation which can be caused during recording and reproducing processes. For example, when the NRZ-I code as shown in FIG. 3 is recorded and reproduced, at the portion where a distance between the magnetization reversals is small, the position of the magnetization reversal is shifted forward on the recording medium due to the effect of self-demagnetization and recording demagnetization. Therefore, the reproduced waveform is shifted toward the left in FIG. 3. Furthermore, at the portion where the distance between the magnetization reversals is small, the waves reproduced from the portions of the magnetization reversal overlap with adjacent reproduced waveforms to cause shifting of the peak positions. Such shifting of peaks tends to lead to errors in detection. Therefore, the recording compensation circuit 19 provisionally shifts the reversal position of the recording code for canceling the shift of the peak position. On the other hand, the equalizer 25 makes the reproduced waveform thinner for avoiding overlapping of the adjacent reproduced waveforms even at the portion where the distance of magnetization reversals is small.

Since the modern magnetic disk drive apparatus has extremely high recording density, signal processing tech-

2 nologies, such as equalizers, are essential. Also, it is important to use the equalizer and so forth adapting to the characteristics of the magnetic disk drive apparatus. Therefore, the trend is to move from a cosine-equalizer as shown in FIG. 4 (see Nishiyama et al., U.S. Pat. No. 4,644,424, issued Feb. 17, 1987, commonly owned), to a high performance transversal-equalizer as shown in FIG. 5 (see Ouchi et al., U.S. Pat. No. 4,651,236, issued Mar. 17, 1987, commonly owned).

SUMMARY OF THE INVENTION

It is important for the equalizer to modify the characteristics thereof by adding attenuators 33, 35, 36 and 37 and delay circuits 34, 38 and 39 and thereby adjust to optimal characteristics. Due to tolerance characteristics a magnetic head and a recording medium, and/or tolerance of spacing between the magnetic head and the recording medium, the characteristics of a magnetic disk drive apparatus tend to fluctuate. Therefore, it is desirable to adjust the characteristics of the equalizer adapting to the characteristics of each individual magnetic disk drive apparatus. However, such adjustment is rarely provided in practice. The reason is that, to properly adjust the equalizer, it becomes necessary to measure the reproduced waveform and/or spectrum of the reproduced signals, which is cumbersome in preparation of the equipment for measurement and so forth and in operation. Also, in the prior art, even when adaptability of the equalizer is degraded due to aging of the magnetic disk drive apparatus, such degradation cannot be detected until detection error actually occurs. The same is true in the recording compensation circuit.

Therefore, it is an object of the present invention to provide a magnetic disk drive apparatus which can solve the aforementioned problem in difficulty of monitoring adaptability of the equalizer, and which has a magnetic recording channel capable of automatic adaption.

In order to accomplish the above-mentioned objects, the present invention provides an evaluation system for a signal waveform, which is applicable for an information processing system handling digital signals. The signal waveform evaluation system establishes a detection window with a clock signal to detect the peak position in the signal waveform within the detection window. Based on the result, the adapting condition of the magnetic recording channel is evaluated.

The invention also includes means for detecting a specific pattern of signal waveform among various waveforms. The distribution of the peaks within the detection window is detected with respect to the specific pattern of the signal waveform.

Further preferably, the means for detecting the specific pattern of waveform detects a plurality of the specific patterns of waveforms for detecting the distribution of the peaks in the detection window with respect to respective specific patterns of the waveforms.

As the specific pattern of the waveform, a pattern having a high possibility of occurrence of error may be selected, for example. An adjustment may be performed by detecting the distribution of the peaks in such a pattern, and by adjusting to obtain peaks distributed in as narrow a range as possible through evaluation.

As a manner of evaluation, it may be possible to divide the detection window into a plurality of ranges and to detect the range in which the peak appears for detecting the distribution of the peak in the detection window with respect to the specific pattern of the waveform.

For example, the distribution of the peaks with respect to the specific pattern of waveform can be detected by a plurality of delay circuits for shifting the phase of a clock signal, a plurality of detection circuits for forming the detection window with the phase shifted clock signal and for detecting the signal waveform, a plurality of shift registers for inputting the outputs of the detectors, and means for performing logical operations with respect to outputs at the terminals of the shift registers.

It is further possible to provide the constructions set forth above within the recording and reproducing apparatus for feeding back the result of evaluation to the magnetic recording channel for automatically adjusting the recording and reproducing conditions.

In one aspect of the invention, there is provided an information recording and reproducing method, in which the reproduced signal from the recording medium is converted into pulses, and the pulses are detected using the detection window. A plurality of reference code patterns are set. The reference code patterns in the pulses are recognized for detecting the distribution of the peaks of the recognized reference code pattern in the detection window. The process for converting the recorded information into a recording current and forming pulses from the reproduced signal is controlled on the basis of the result of detection.

It is desirable that the reference code patterns includes at least a two bit pattern ("0110" or "0010100" at run-length limited code such as (1–7) code) and a low density pattern ("010" or "00100", respectively).

As shown in FIG. 1, a diagnostic system of a magnetic recording channel, constructed according to the present invention, comprises three detectors 5, 6 and 7 for receiving respectively mutually different phases of VCO clocks as inputs, three shift registers 8, 9 and 10 for inputting output data of the detectors 5, 6 and 7, comparators 12-1 through 12-n for comparing n types of data patterns with data in the three shift registers 8, 9 and 10, a plurality of counters 13-1 to 13-n, 14-1 to 14-n and 15-1 to 15-n, and indicators 16-1 to 16-n and 17-1 to 17-n for indicating the contents of the counters.

In the detection circuit, during a period from trailing edge to trailing edge of a VCO pulse input for the detection circuit (which will be hereafter referred to as the "detection window"), if a peak pulse input for the detection circuit is also present, the data at that timing is regarded as "1". However, since the peak pulse is subject to jitter due to noise superimposed on the reproduced signal or to a peak shift due to interference from the adjacent waveforms, the phase of the peak pulse in the detection window relative to the VCO clock is fluctuating even when the information is "1". Therefore, it is typical that the peak pulse will not appear at the center of the detection window.

Considering NRZ-I code as one example, the code patterns, such as "0110" or "0010100" (so-called two bit patterns) are easily affected by interference from an adjacent waveform. As affected, the peak pulses have a tendency to cause peak shifts to shift away from each other. Therefore, when the phase of the peak pulse of a two bit pattern is included in a random code pattern, the left side peak pulse 40 will have a distribution of probability density inclining to shift toward the left in the detection window, and the right side peak pulse 41 will have a distribution of probability density inclining to shift toward the right in the detection window, as shown in FIG. 6B. When the reproduced waveform is made thinner by the equalizer, the magnitude of shifting toward left and right becomes smaller as shown in FIG. 7A. However, when the adaption of the equalizer is not optimum and thus the reproduced waveform is not made sufficiently thinner, the magnitude of shifting toward left and right is clearly increased as shown in FIG. 7B.

On the other hand, interference of the adjacent waveforms has an effect of making the peak of the reproduced waveform sharp to reduce jitter due to noise. Therefore, jitter becomes large for a pattern having low density, such as the code pattern "010" or "00100", which receives smaller influence of interference of the adjacent waveform. When the phase of the peak pulse is checked for such a low density pattern, the widely spread distribution of probability density can be seen, as shown in FIG. 8.

Optimization of the equalizer can be achieved by making the distributions of FIGS. 6B and 8 as narrow as possible, and by shifting the peak pulse toward the center of the detection window, for reducing the possibility of detection error. However, in order to make the reproduced waveform thinner for reducing peak shift in the two bit pattern, it becomes necessary to emphasize the high frequency gain in the transfer function frequency characteristics of the reproducing channel. As a result, noise level can become higher to cause greater jitter. Therefore, there is a limitation in narrowing the range of distributions of FIGS. 6B and 8 by the equalizer. It is found that the condition of the equalizer can be evaluated by comparing the distributions of FIGS. 6B and 8. For instance, when both distributions have substantially equal widths of ranges, the equalizer often operates in optimum condition. Accordingly, by evaluating the difference and variation of distribution of probability of the peak pulse with respect to the code patterns which have a high possibility of causing detection error, such as those in FIGS. 6B and 8, the adapting condition of the equalizer can be evaluated.

In the construction of FIG. 1, with the detector 6, the shift register 9 and the comparators 12-1 to 12-n, the code pattern is checked to determine whether it matches with one of n types of specific code patterns (as stored in a memory 11). When judgement is made by the comparator 12-i (i=1, 2, . . ., n) that the code pattern coincides with one of the specific patterns, the occurrence of the particular pattern is counted by the counter 13-i. Also with other detectors 5 and 7, detection is performed for the cases that the peak pulse is relatively delayed and advanced for a given period. Then, judgement is made by the comparator 12-i whether the same results as these obtained with respect to the output from the detector 6 are obtained or not. When the results are different from those obtained from the detector 6, the occurrence of the different results is counted by the counters 14-i and 15-i. The counter 13-i is responsive to the counter value reaching a set value stored in the memory 11 to indicate the contents of the counters 14-i and 15-i on the indicators 16-i and 17-i, and to clear the counter values of the counters 13-i, 14-i and 15-i to restart counting. Through these counter values, the offset and variation of the distribution of probability of the peak pulse in the specific pattern can be detected and the adapting condition of the equalizer can be detected.

BRIEF DESCRIPTION OF THE DRAWINGS

FIG. 9B is an explanatory illustration for illustrating the meaning of a counter value of a counter;

FIG. 14 is a block diagram of a delay circuit that is useful in the second embodiment of the diagnostic system.

DESCRIPTION OF THE PREFERRED EMBODIMENT

Figure 1:
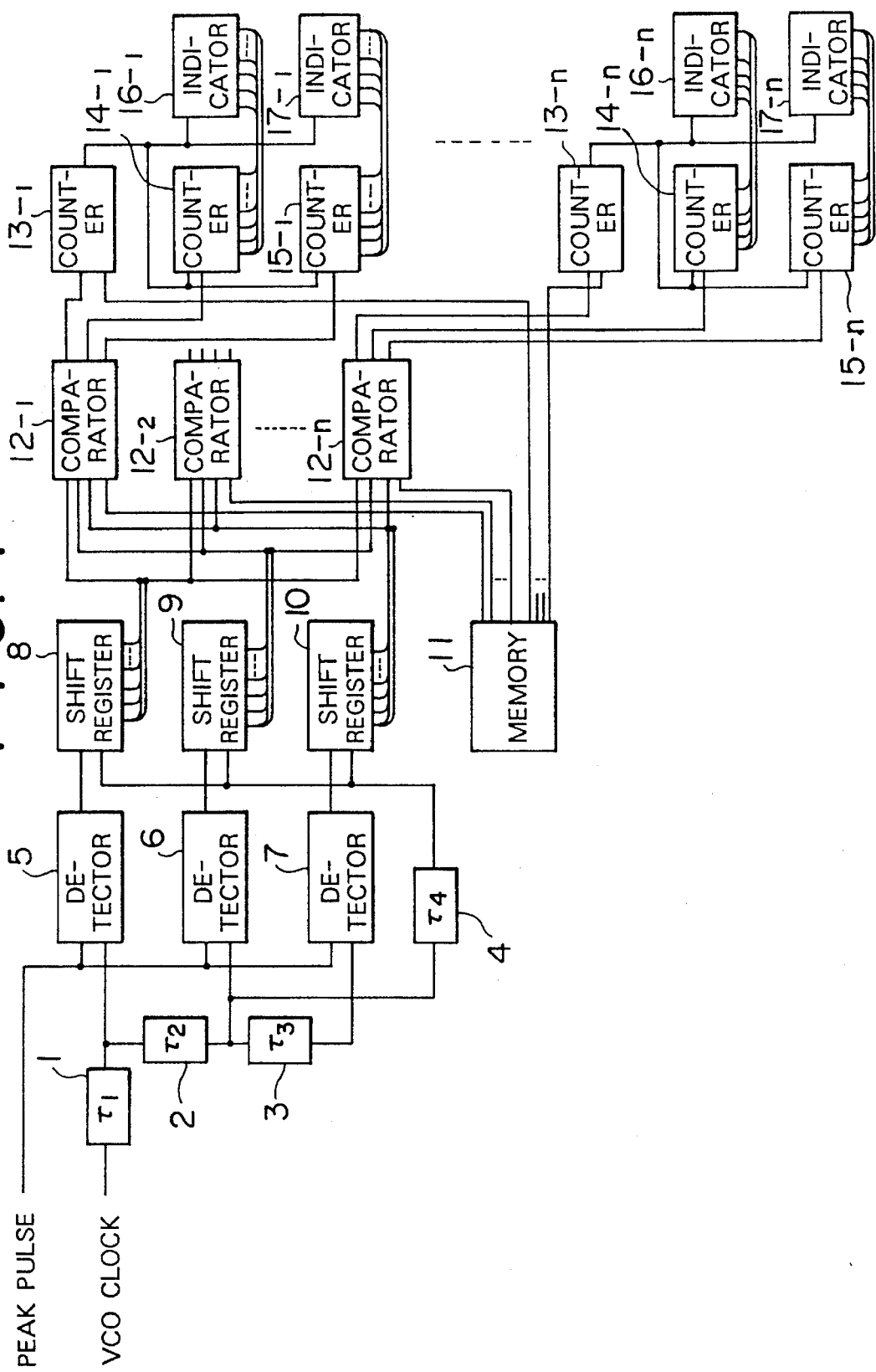
FIG. 1 is a block diagram of a diagnostic system of a magnetic recording channel according to the present invention.

The first embodiment of a diagnostic system of a magnetic recording channel according to the present invention will be discussed herebelow with reference to FIG. 9A. A VCO clock signal is input to a first detector 47 via a first delay element 43 and to a second delay element 44. The VCO clock signal passing through the second delay element 44 is input to a third delay element 45 and to a second detector 48. The VCO clock signal passing through the third delay element 45 is input to a third detector 49. A peak pulse is input to the first, second and third detectors 47, 48 and 49. Read pulses at the outputs of the first, second and third detectors 47, 48 and 49 are input to first, second and third shift registers 50, 51 and 52 respectively, in synchronism with a VCO clock signal adjusted by a fourth delay element 46. The registers have output terminals $Q_0, Q_1, Q_2, Q_3, Q_4, Q_5$ and $Q_6$. Output pulses of a comparator logic circuit connected to each of the registers are input to counters 53 through 58 so that the counter values of respective counters are displayed on indicators 59 through 62.

It should be noted that the shown embodiment is so constructed as to make evaluation for a two bit pattern (0010100) and a low density pattern (00100) as specific patterns in case of (1–7) code. The delay times $\tau_2$ and $\tau_3$ of the second and third delay elements 44 and 45 are set to be about one quarter of the width of the detection window.

The read pulse output from the detector 48 is input to a data input $D_0$ of the shift register 51 and then shifted through the output terminals $Q_0, Q_1, Q_2, Q_3, Q_4, Q_5$ and $Q_6$, in order in synchronism with clock pulse input CP. Here, assuming that a logical operation for $\bar{Q}_0 \cdot Q_2 \cdot Q_4 \cdot \bar{Q}_6$ is performed with respect to the output terminals $Q_0, Q_2, Q_4$ and $Q_6$, the result "1" can be obtained when $Q_0=Q_6=0$ and $Q_2=Q_4=1$. In addition, in (1–7) code, "1" will never appear consecutively, from the result of $Q_2=Q_4=1$, so it can also be appreciated that $Q_1=Q_3=Q_5=0$.

Namely when 0 0 1 0 1 0 0 are input in order for the data input of the shift registers, the result of OV logical operation $\bar{Q}_0 \cdot Q_2 \cdot Q_4 \cdot \bar{Q}_6$ becomes 1. Then, a pulse input for the clock pulse input of the counter 53 is performed. Therefore, in the counter, the number of occurrences of the input two bit pattern (0010100) can be counted.

On the other hand, for the two bit pattern (0010100), the possibility of delay of the latter "1" is evaluated with reference to $Q_1$ of the shift register 50 and the possibility of advancing of the former "1" is evaluated with reference to $Q_5$ of the shift register 52. The read pulse input to the shift register 50 is the pulse detected with the VCO clock pulse having a relatively advanced phase. When the peak pulse is in a range of phase of one quarter from the right side of the detection window at the detector 48, the peak pulse is included in the right side adjacent detection window at the detector 47. Therefore, the read pulse delays for one clock period. As a result, when the code pattern output from the detector 48 is the two bit pattern (0010100) and when the latter "1" is in the phase range of one quarter from the right side of the detection window at the detector 48, the output $Q_4$ of the shift register 50 becomes "1". Therefore, the pulse input for the clock pulse input CP for the counter 54 is performed. Similarly, when the former "1" of the two bit pattern (0010100) is in a phase range of one quarter from the left side of the detection window, the output $Q_5$ of the shift register 52 becomes "1". Therefore, a pulse is input for the clock pulse input CP of the counter 55.

Accordingly, in the first counter 53, the occurrence of the two bit pattern is counted. In the second counter 54, the occurrence of the right side peak pulse of the two bit pattern within the phase range of one quarter from the right side edge of the detection window is counted. Also, in the third counter 55, the occurrence of the left side peak pulse of the two bit pattern within the phase range of one quarter from the left side edge of the detection window is counted.

Similarly, in the fourth counter 56, the occurrence of the low density pattern is counted. In the fifth counter 57, the occurrence of the peak pulse of the low density pattern in the phase range of one quarter from the right side edge of the detection window can be counted. Furthermore, in the sixth counter 58, the occurrence of the peak pulse of the low density pattern in the phase range of one quarter from the left side edge of the detection window can be counted.

Therefore, the counter values of respective counters indicate the distribution of "1" in the specific patterns (00100) and (0010100) in the detection window as shown in FIG. 9B.

When the first counter 53 is responsive to the counter value, reaching a preset value the second and third counters 54 and 55 output the counter values to the first and second indicators 59 and 60. At the same time, the first, second and third counters 53 to 55 are cleared and restarted. Similarly, the fourth counter 56 is responsive to the counter value reaching a preset value to make the fifth and sixth counters 57 and 58 output counter values to the indicators 61 and 62. Then, the fourth, fifth and sixth counters 56 to 58 are cleared and restarted. Therefore, the values of the indicators can be indications of the phase shifting and expansion of jitter of the two bit pattern and the low density pattern. When one of the values of the first, second, third and fourth indicators 59 to 62 exceeds a respective set value, an alarm lamp for each indicator is turned on.

As set forth above, a high possibility of fluctuation of distribution of the peak pulse, thus causing detection error, can be noticed by the alarm lamp. Furthermore, it is also possible to make diagnosis of a not adapted condition of the magnetic recording channel, such as by the equalizer, at this time. One example of possible diagnosis and corrective measure therefor is listed in the following table 1.

TABLE 1

DIAGNOSIS FOR MAGNETIC RECORDING CHANNEL

| k | l | m | n | Diagnosis | Measure |
|---|---|---|---|---|---|
| X | X | o | o | Too wide waveform | Make thinner |
| o | o | X | X | Too thin waveform | Make wider |
| X | o | o | o | Left shift of low density pattern | Adjust recording compensation |
| o | X | o | o | Right shift of low density pattern | Adjust recording compensation |
| o | o | X | o | Left shift of two bit pattern | Adjust recording compensation |
| o | o | o | X | Right shift of two bit pattern | Adjust recording compensation |
| X | o | X | o | Right shift of detection window | Shift left |
| o | X | o | X | Left shift of detection window | Shift right |

Figure 9A:
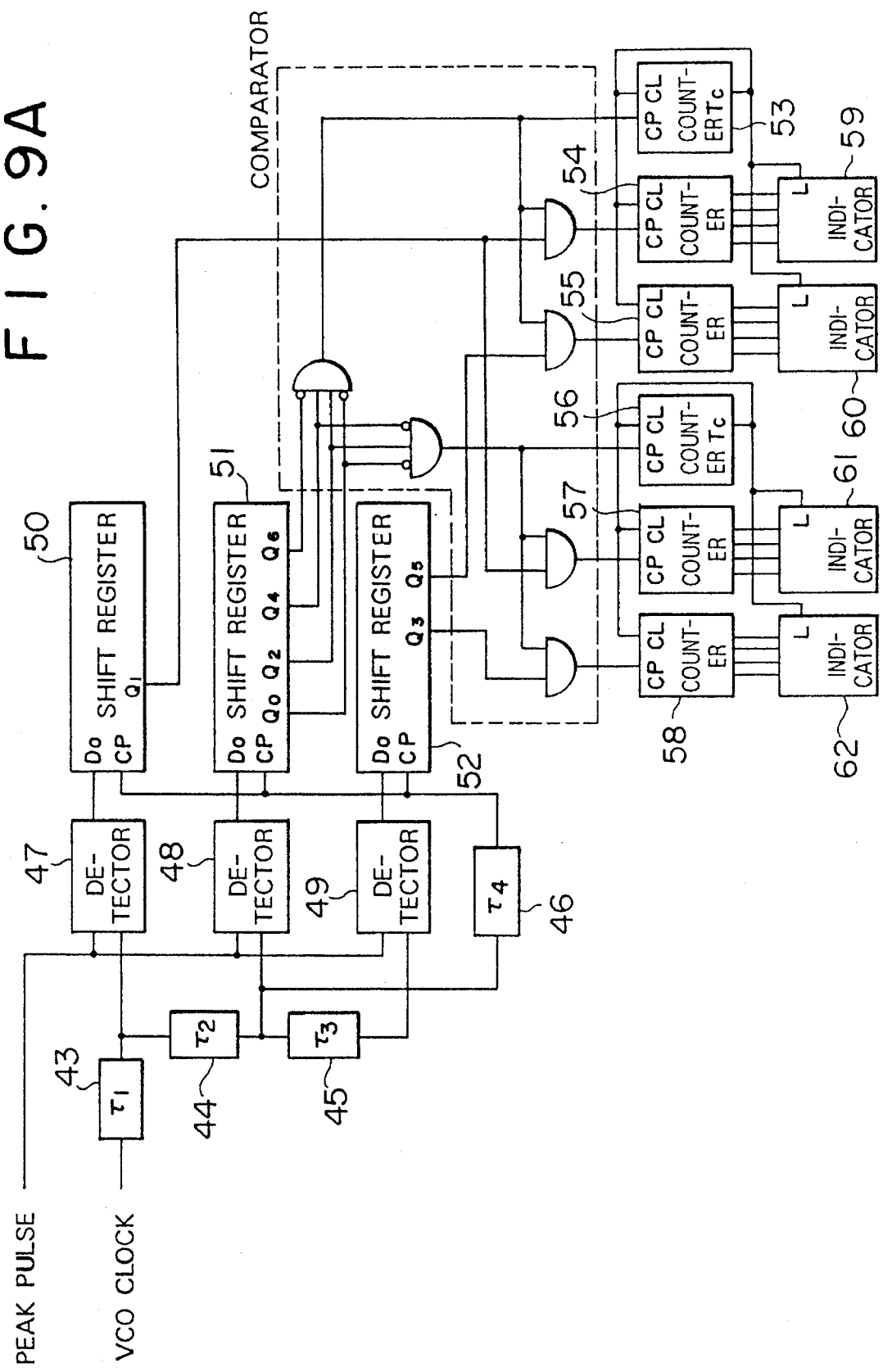
FIG. 9A is a block diagram of the first embodiment of a diagnostic system of a magnetic recording channel according to the present invention.

Here, k, l, m, n respectively correspond indicators 62, 61, 60 and 59 of FIG. 9A, X represents a value greater than a standard value, and o represents a value smaller than or equal to the standard value.

Figure 2:
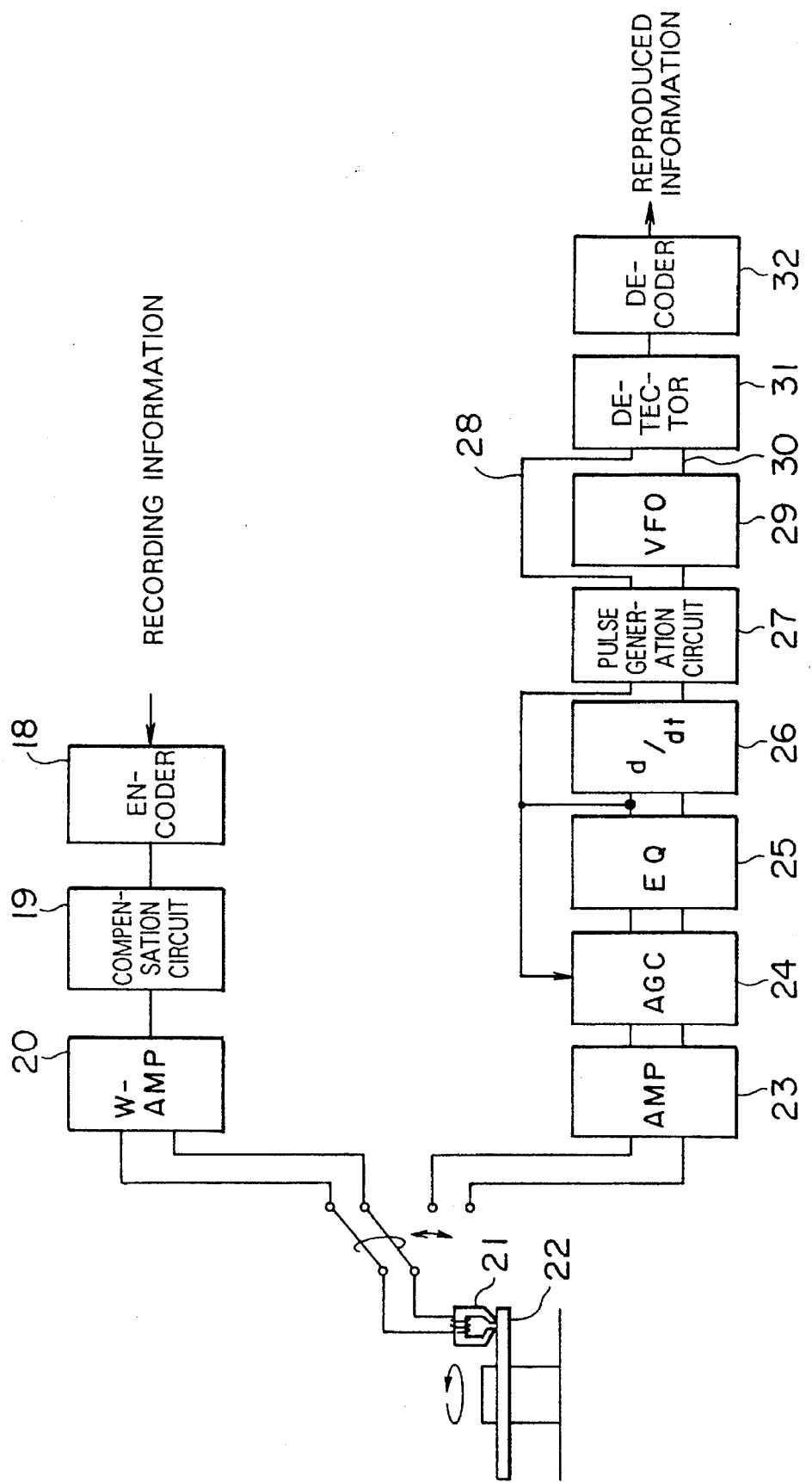
FIG. 2 is a block diagram of a signal processing system of a typical magnetic disk drive apparatus.
Figure 3:
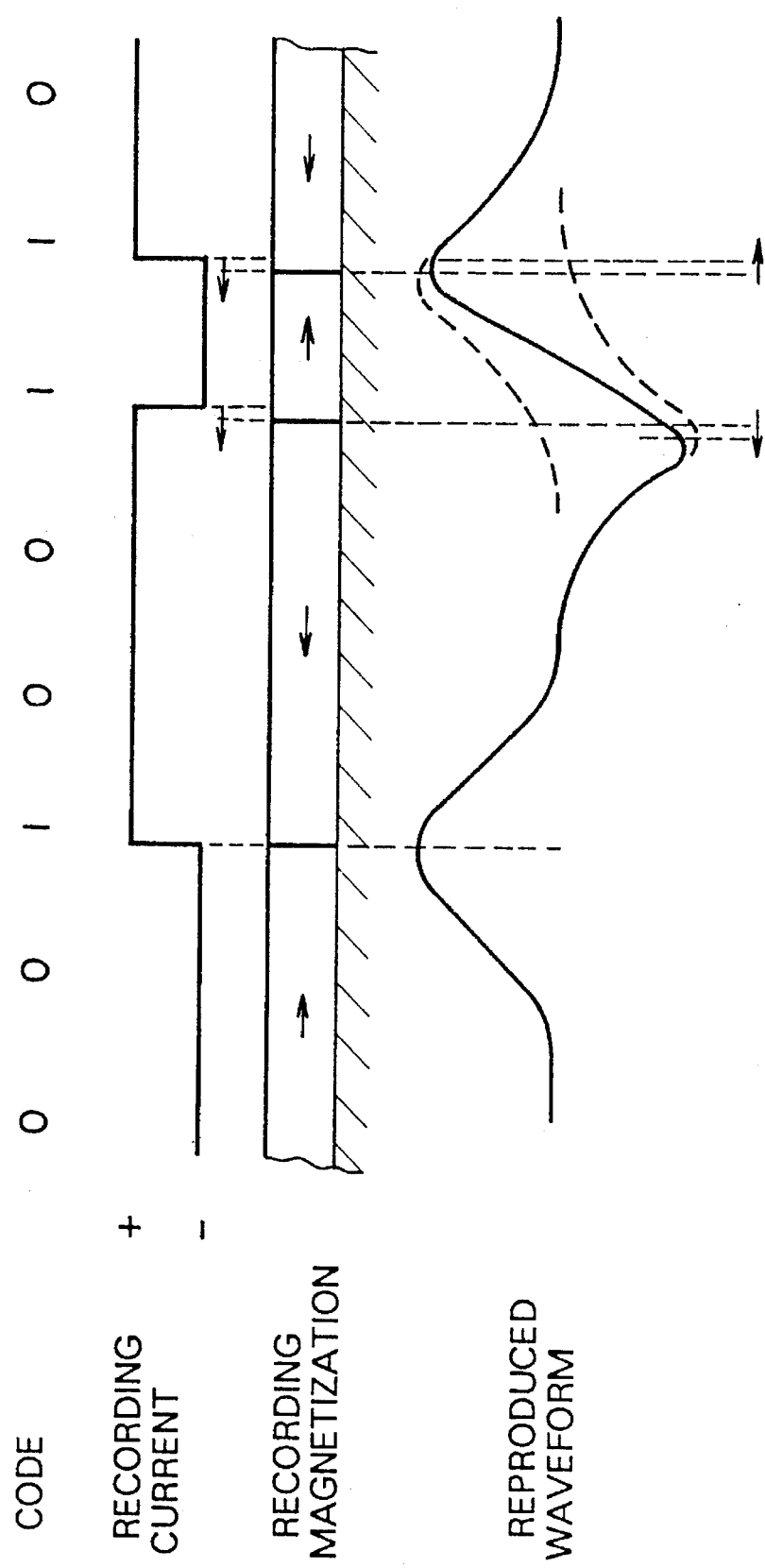
FIG. 3 is a waveform diagram illustrating the phase relationship between recording current, recording magnetization and reproduced waveform in NRZ-I code.
Figure 4:
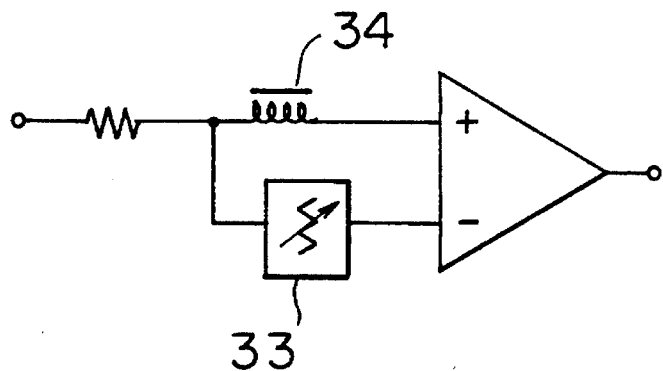
FIG. 4 is a block diagram of a cosine-equalizer.
Figure 5:
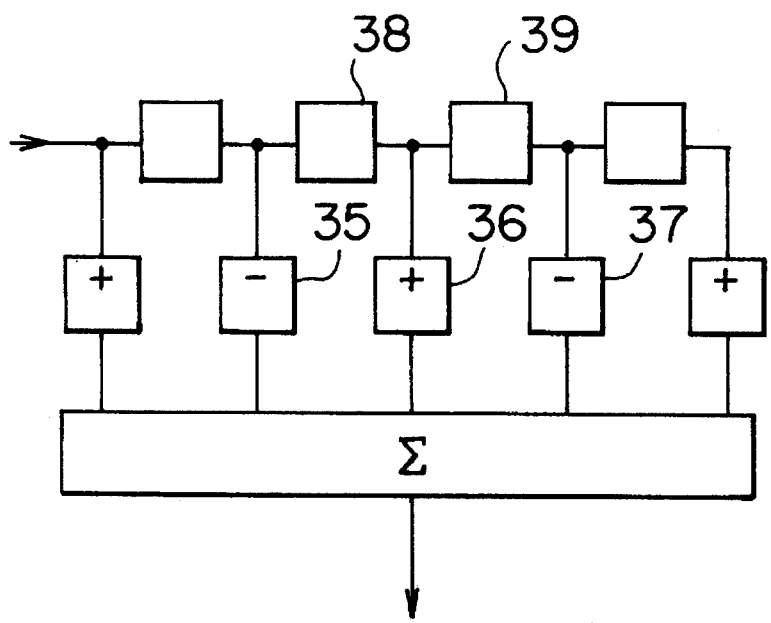
FIG. 5 is a block diagram of a transversal-equalizer.
Figure 6A:
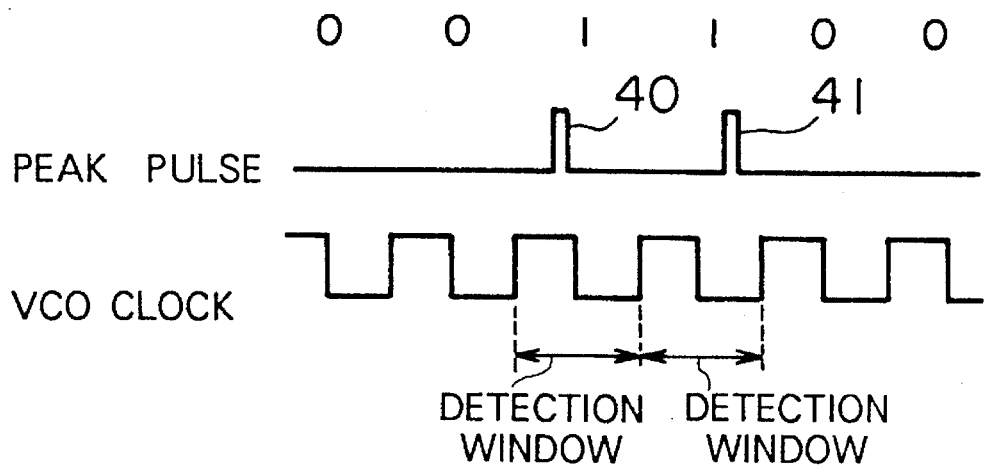
FIG. 6A is a waveform diagram illustrating the input pulses of a detector that is useful in the circuit shown in FIG. 1.
Figure 6B:
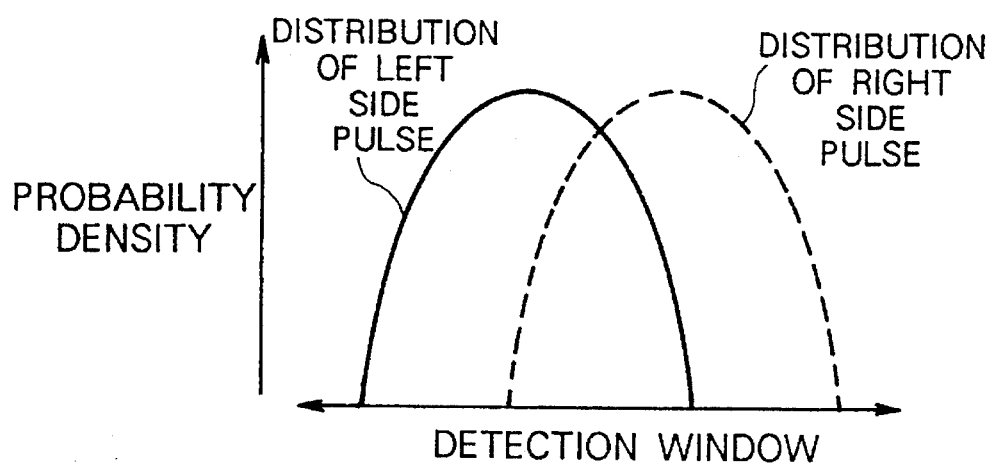
FIGS. 6B, 7A and 7B are waveform diagrams illustrating the phase distribution of peak pulses in two bit patterns.
Figure 7A:
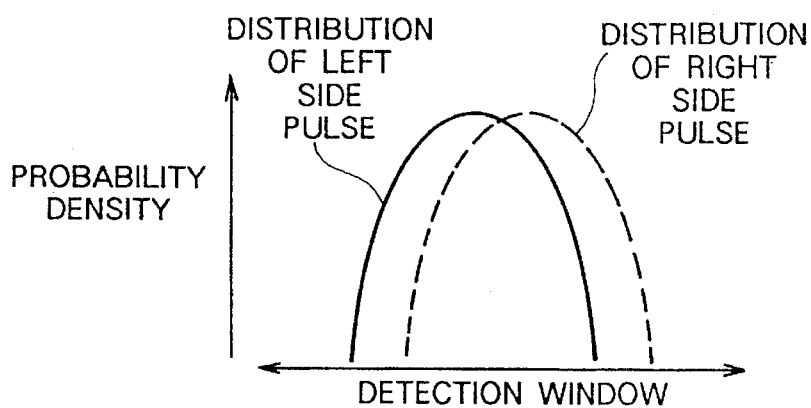
Figure 7B:
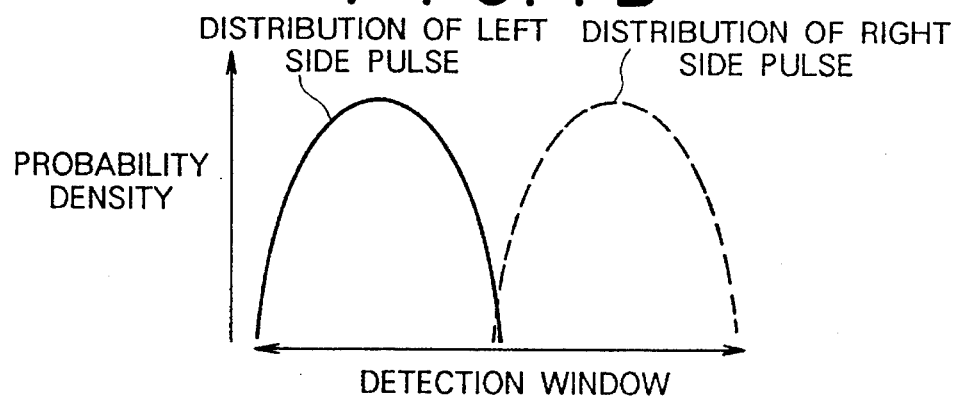
Figure 8:
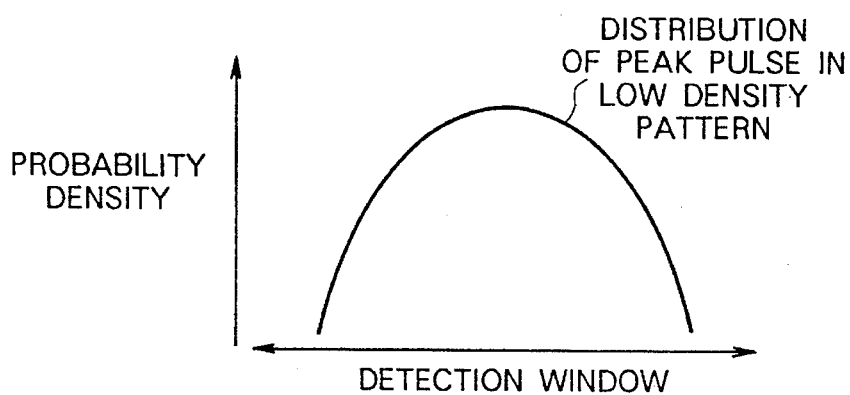
FIG. 8 is a waveform diagram illustrating the phase distribution of a peak pulse in a low density pattern.

The diagnosis system for the magnetic recording channel according to the present invention receives, as input signals, the peak pulse on the line 28 applied to the input of the detector 31, and the VCO clock on the line 30 in FIG. 2. Accordingly, it can be easily connected to the magnetic disk drive apparatus and thus facilitate diagnostic operation. In addition, since the diagnostic system of the magnetic recording channel according to the present invention can be a replacement for the detector 31, it is possible to construct a magnetic disk drive apparatus incorporating this diagnostic system of the magnetic recording channel. In such a case, the diagnosis can be performed by the user of the magnetic disk drive apparatus. Therefore, abnormalities can be detected before the actual occurrence of a detection error due to aging and so forth.

As set forth above, according to the depicted embodiment, since the adapting condition of the magnetic recording channel, such as an equalizer can be easily determined from the counter indication, the magnetic recording channel can be easily optimized. Therefore, it becomes possible to provide a highly reliable magnetic disk drive apparatus.

Figure 10:
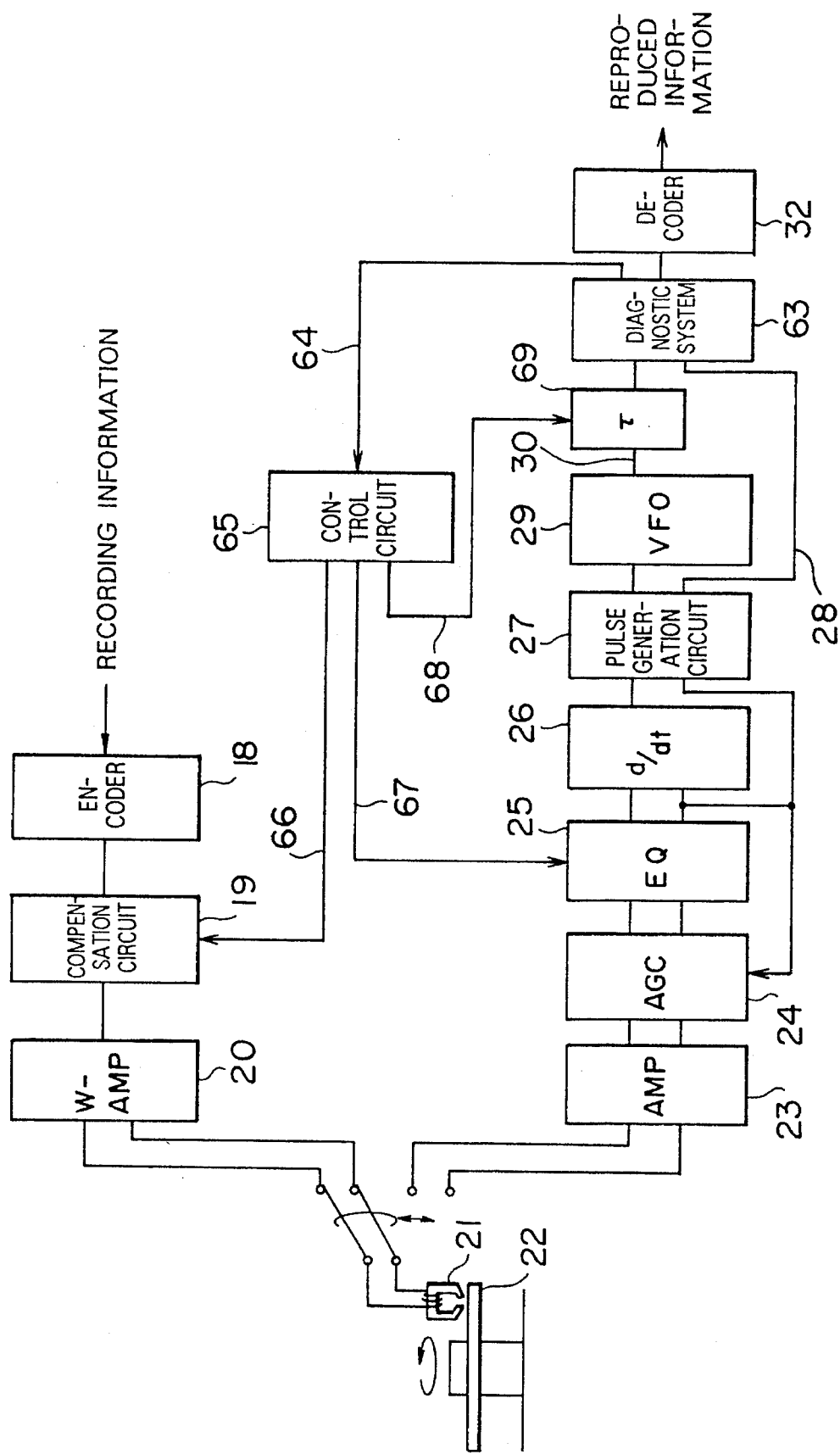
FIG. 10 is a block diagram of the second embodiment of a diagnostic system of a magnetic recording channel according to the present invention.

The second embodiment of the present invention will be discussed in terms of the magnetic disk drive apparatus, for which the diagnostic system of the magnetic recording channel is applied for automatically optimizing the magnetic recording channel. FIG. 10 shows the construction of the magnetic disk drive apparatus of the second embodiment of the invention. A diagnostic system of the magnetic recording channel 63 which also serves as the detector inputs a counter value through a line 64 to a circuit constant controlling circuit 65. The circuit constant controlling circuit 65 then controls the recording compensation circuit 19, the equalizer 25 and a delay circuit 69.

Figure 11:
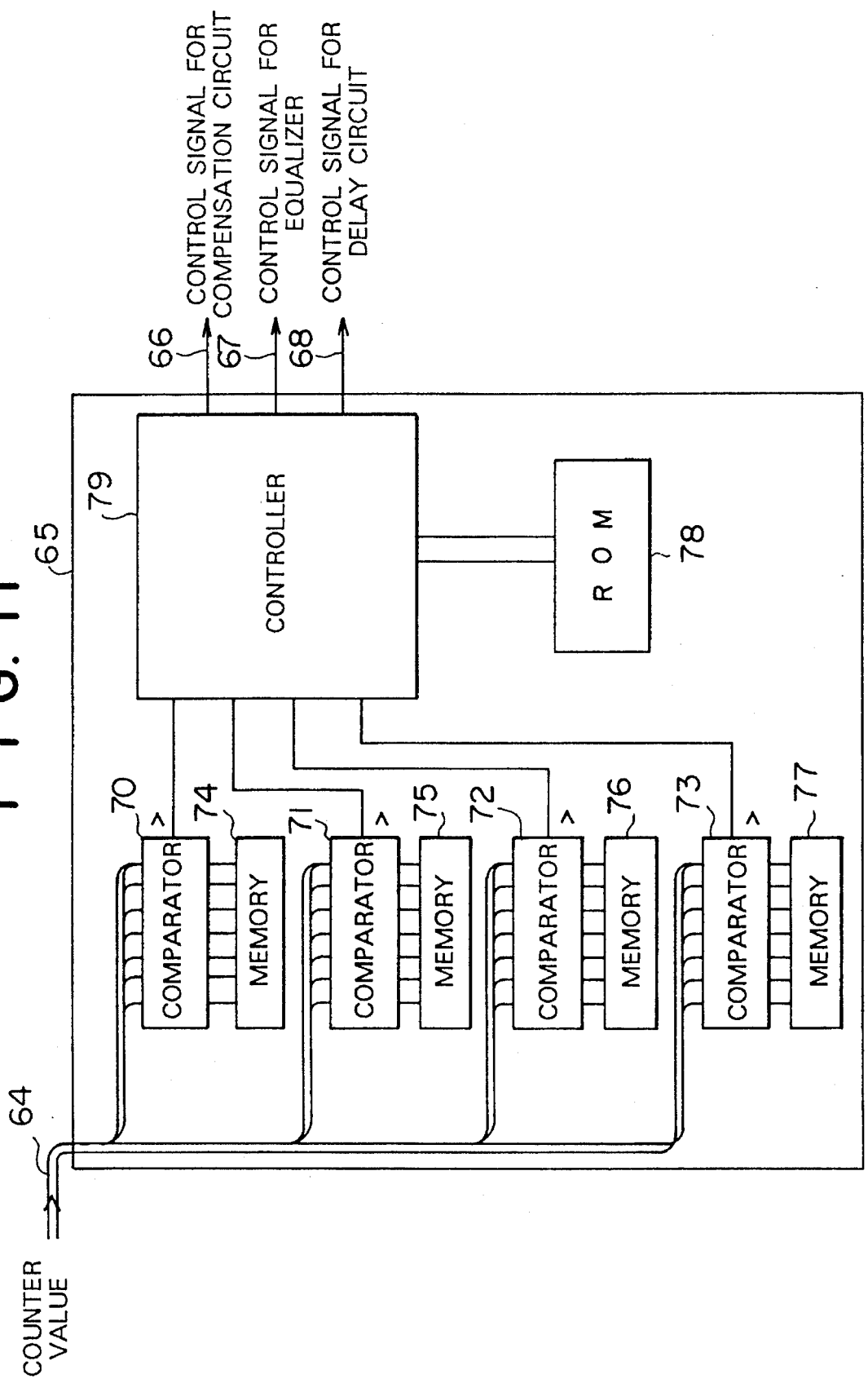
FIG. 11 is a block diagram of a circuit constant control circuit that is useful in the second embodiment of the diagnostic system.

One example of the construction of the circuit constant controlling circuit 65 is shown in FIG. 11. The depicted construction of the circuit constant controlling circuit 65 includes comparators 70 to 73, ROM 78, a controller 79, and re-writable memories 74 to 77. ROM 78 stores diagnostic information similar to that shown in table 1. The controller 79 reads out control information from the information stored in ROM 78 corresponding to the counter value on the line 64. The controller 79 then feeds control signals to the recording compensation circuit 19, the equalizer 25 and the delay circuit 69 through lines 66, 67 and 68 for increasing and decreasing.

Figure 12:
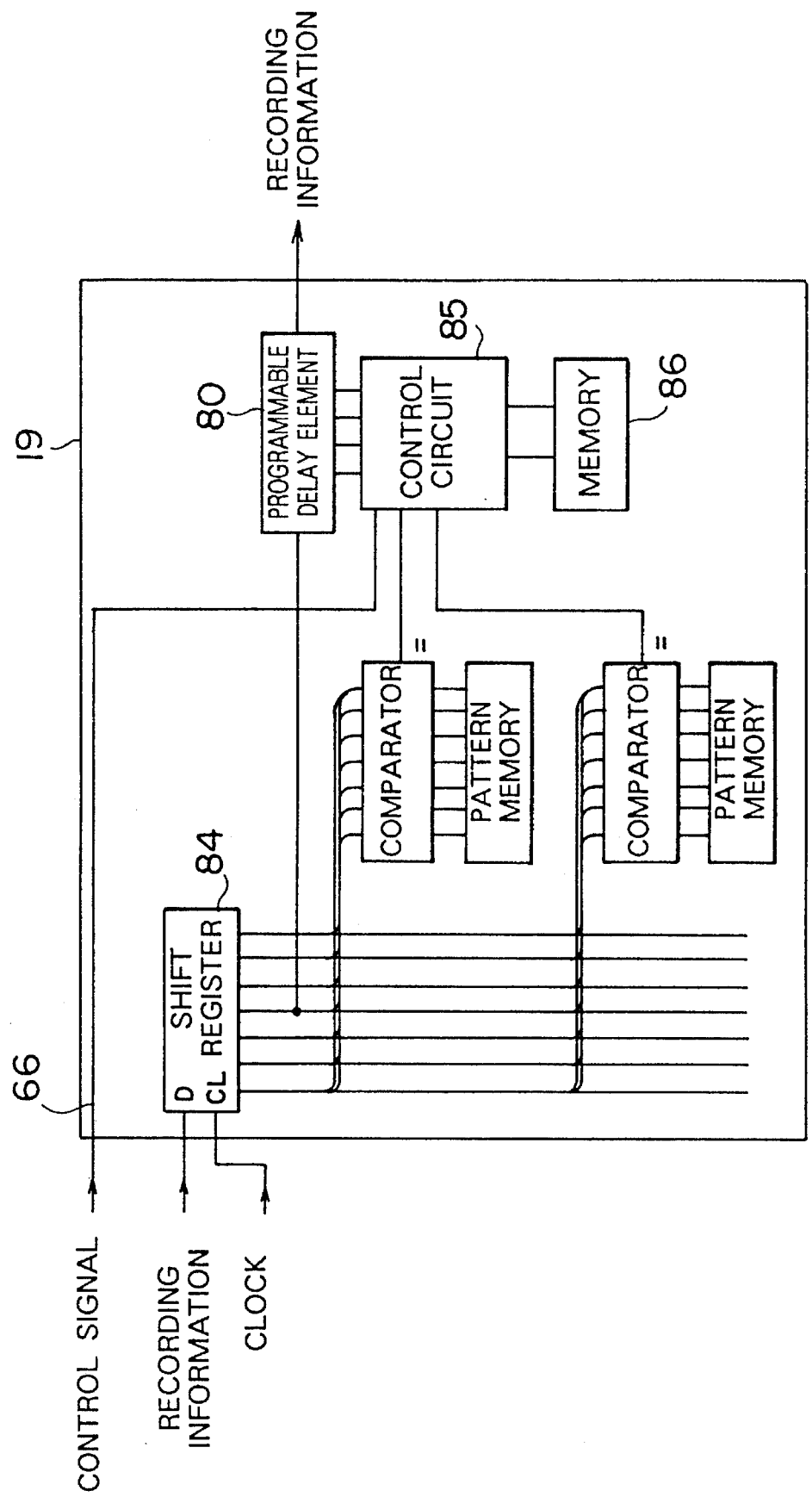
FIG. 12 is a block diagram of a recording compensation circuit that is useful in the second embodiment of the diagnostic system.

One example of the recording compensation circuit 19 is illustrated in FIG. 12. The information to be recorded is received and shifted by the shift register 84 in order in synchronism with the clock. The output at one output terminal of the shift register 84 (the center output in the illustration) is input to a programmable delay element 80. The delay element 80 provides a given delay and outputs the recording information. In the case that the magnitude of delay in the programmable delay element 80 is constant, each pulse of the recording information through the recording compensation circuit is synchronous with the clock signal. In the normal case, when the pulse containing the recording information is a specific bit of a specific pattern, the magnitude of delay of the programmable delay element 80 is varied in accordance with information stored in a pattern memory, a comparator, information stored in a memory 86 and a control circuit 85.

Discussion will be given for an example in which, as a result of comparison of the pattern at the output terminal of the shift register 84 and a stored pattern by the comparator, the bit to be input to the programmable delay element 80 is the former "1" of the two bit pattern.

In such case, a matching signal is fed from the comparator to the control circuit 85. The control circuit 85 then generates the control signal for increasing the magnitude of delay of the programmable delay element 80 with reference to the delay magnitude stored in the memory 86. As a result, the phase of the former "1" in the two bit pattern is relatively delayed. Furthermore, the recording compensation circuit 19 receives the control signal on the line 66 generated by the circuit constant controlling circuit 65. The control signal on the line 66 contains diagnostic diagnosis information similar to that in the foregoing table 1.

For example, as indicated in the fifth row of the table 1, when a signal indicative of m greater than the standard value is provided, namely, when the phase of the former "1" of the two bit pattern (0010100) is excessively advanced, the magnitude of delay for the former "1" of the two bit pattern (0010100), which is stored in the memory 86, is updated to be a greater value.

On the other hand, as indicated in the sixth row of the table 1, when the signal indicative of n greater than the standard value is provided, namely, when the latter "1" in the two bit pattern is excessively delayed, the magnitude of delay in the memory 86 for the latter "1" in the two bit pattern (0010100) is updated to be a smaller value.

Furthermore, as in the third and fourth rows in the table 1, when the signal indicative of either k or l greater than the standard value is provided, namely, the phase of "1" of the low density pattern (00100) is excessively advanced or delayed, the delay magnitude in the memory 86 for the "1" in the low density pattern (00100) is updated to be a greater or smaller value, respectively. Through the process set forth above, the magnitude of recording compensation can be controlled by a greater or smaller value.

Figure 13:
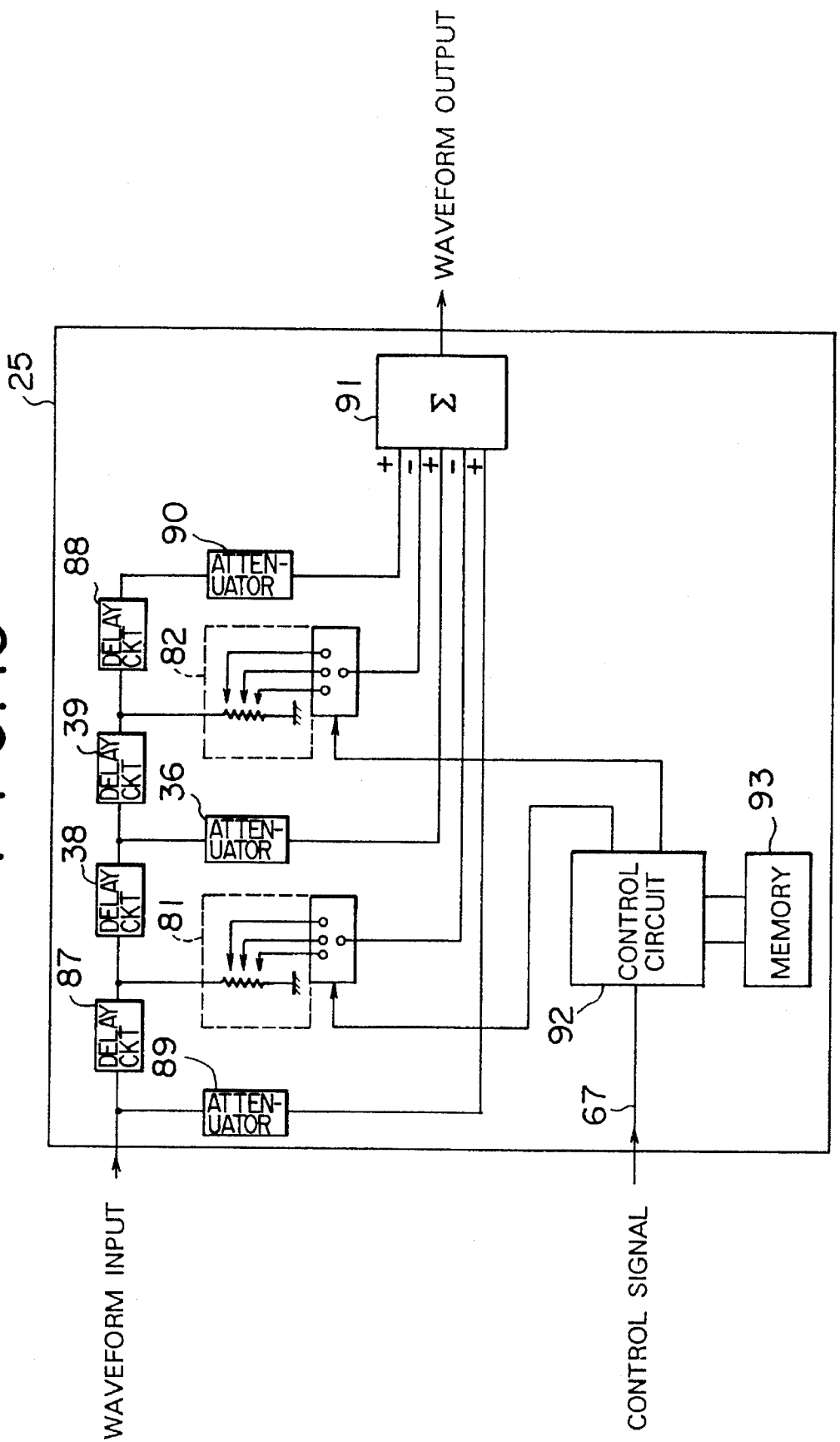
FIG. 13 is a block diagram of an equalizer that is useful in the second embodiment of the diagnostic system.

FIG. 13 shows one example of the equalizer 25. The equalizer 25 shown in FIG. 13 is a 5 tap transversal-equalizer. The waveform input passes through delay circuits 87, 38, 39, and 88, each of which provides a predetermined delay time for the input. From both ends of respective delay circuits, five signals are extracted and applied to attenuators 89, 81, 36, 82 and 90, respectively. The attenuators attenuate respectively at a given rate.

The attenuated signals are input to a summing circuit 91 to be summed or subtracted and then output as a waveform output.

In the construction of FIG. 13, taking the output waveform of the attenuator 36 as a main waveform, by subtracting the output waveforms from the attenuators 81 and 82 which have phases advanced and delayed with respect to the main waveform, slimming of the main waveform is performed. The output waveforms of the attenuators 89 and 90 are added for the slimmed main waveform in order to remove residual distortion in the waveform. Accordingly, when attenuation rates of the attenuators 81 and 82 are decreased, the waveform output becomes thinner, and when the attenuation rates thereof are increased, the waveform output becomes wider. These attenuation rates are set by a control circuit 92 with reference to the attenuation rates stored in a memory 93. The attenuation rates stored in the memory 93 can be adjusted to be proper values corresponding to the reproduced waveform depending upon the combination of the magnetic head and the magnetic disk.

Although it is not included in FIG. 13, the attenuation rate is controlled depending upon the radial position on the disk to be reproduced, in the magnetic disk drive apparatus.

Furthermore, the equalizer 25 receives the control signal on the line 67 generated by the circuit constant controlling circuit 65. The control signal on the line 67 includes diagnosis information similar to that in the table 1. For example, as in the first row of the table 1, when a signal which corresponds to the case in which k and 1 are greater than the standard values is fed to the line 67 as the control signal, namely, when the waveform is excessively wide, the control circuit 92 updates the attenuation rates for the attenuators 81 and 82 to be smaller values, to make the reproduced waveform thinner. On the other hand, as in the second row of the table 1, when the signal which corresponds to the case in which m and n are greater than the standard values is fed to the line 67 as the control signal, the control circuit 92 updates the attenuation rates for the attenuators 81 and 82 to be greater values for making the reproduced waveform wider. As set forth above, the width of the waveform can be controlled to be wider and thinner.

Finally, one example of the delay circuit 69 connected to the output of VFO 29 is illustrated in FIG. 14. The delay circuit of FIG. 14 receives the VCO clock and outputs the clock signal with a given delay in accordance with the programmable delay element 83. Here, the delay time is set by a control circuit 94 with reference to the delay magnitude stored in a memory 95 so as to properly adjust the phase of the VCO clock and the peak pulse on a line 28 and thus to concentrate the peak pulse to be distributed around the center portion. Furthermore, the delay circuit 69 receives the control signal on the line 68 from the circuit constant controlling circuit 65. The control signal on the line 68 includes diagnosis information similar to that in the foregoing table 1. For example, as in the seventh row of the table 1, when the signal corresponding to the case that k and m are greater than the standard values thereof, is supplied to the line 68 as the control signal, namely when the phase of the clock is delayed, the control circuit 94 updates the delay magnitude stored in the memory 95 to be smaller, and the phase of the clock is advanced by reducing the delay magnitude of the programmable delay element 83. On the other hand, as in the eighth row of the table 1, when the signal corresponding to the case that 1 and m are greater than the standard values, the control circuit 94 is updates the delay magnitude for the greater delay, and, at the same time, the phase of the clock in the programmable delay element 83 is programmed for greater delay.

As set forth above, the relative phases of the VCO clock and the peak pulse on the line 28 are controlled.

The control signals on the lines 66 to 68 may be generated at every end of reproduction for one track. In the alternative, it may also be possible to accumulate the counter value of the diagnostic system of the magnetic recording channel on the line 64 and generate the control signals on the lines 66 to 68 with predetermined time intervals. In the further alternative, it may be possible to provide a manually operable switch enabling selection of a test mode, so that the control signals on the lines 66 to 68 can be generated at the above-mentioned timings during test mode operation.

According to the second embodiment set forth above, it becomes possible to automatically maintain the magnetic recording channel including the recording compensation circuit, the equalizer, and the delay circuit at optimal condition. Therefore, it becomes possible to provide highly reliable magnetic disk drive apparatus.

Since the present invention facilitates diagnosis of the adapting conditions of the magnetic recording channel, such as the equalizer, in the magnetic disk drive apparatus and makes it easy to find a corrective measure when the magnetic recording channel is not optimally adapted, it becomes possible to optimally use the maximum performance of the magnetic head, the recording medium and the magnetic recording channel for providing high reliability in the magnetic disk drive apparatus.

What is claimed is:

1. An evaluation system for evaluating a magnetic recording system which modifies code inversion timings of a binary code stream to be recorded to produce a compensated binary code stream, records the compensated binary code stream on a magnetic recording medium and thereafter reproduces a signal by reading out the recorded signal from said recorded medium, and equalizes the waveform of the reproduced signal to produce an equalized signal, the evaluation system comprising:

discriminating means for discriminating whether a peak of said equalized signal exists within each of a plurality of repeatedly-generated detection windows;

pattern detection means comprising memory means for memorizing discrimination results generated from said discriminating means, and generating means for generating a coincident signal each time that said memorized discrimination results are coincident to a predetermined specific bit pattern;

peak distribution detecting means for obtaining a peak position distribution of peaks of said equalized signal indicating a particular bit of said predetermined specific bit pattern by analyzing and storing, each time said coincident signal is generated, a peak position of said equalized signal in one of the detection windows which corresponds to said particular bit in said predetermined specific bit pattern, wherein said detection window corresponding to said particular bit is divided into a plurality of regions, and the peak position is detected in one of said regions by operation on said memorized discrimination results; and display means for displaying an evaluation value representing the peak position distribution and indicating a signal modification of said code inversion timings or said reproduced signal.

2. An evaluation system as claimed in claim 1, wherein said discrimination results generated by said discriminating means are generated synchronously with an output from said peak distribution detection means and pursuant to a clock signal representative of a detection window.

3. A magnetic recording system, comprising;

a compensation circuit for modifying code inversion timings of a binary code stream to be recorded to produce a compensated binary code stream;

recording and reproducing means for recording the compensated binary code stream on a magnetic recording medium and for reproducing a signal by reading out a recorded signal from said magnetic recording medium;

an equalizer for equalizing a waveform of the reproduced signal;

peak detection means connected to the output of said equalizer for detecting peaks of the equalized signal;

discriminating means, connected to the output of said peak detection means, for discriminating whether a peak of the equalized signal exists within each of a plurality of repeatedly-generated detection windows to reproduce said binary code stream;

pattern detection means comprising memory means for memorizing discrimination results generated from said discriminating means, and generating means for generating a coincident signal each time a series of discrimination results sequentially generated from said discriminating means is coincident to a predetermined specific bit pattern;

peak distribution detecting means for obtaining a peak position distribution of peaks of said equalized signal indicating a particular bit of said predetermined specific bit pattern by analyzing and storing, each time said coincident signal is generated, a peak position of said equalized signal in a detection window corresponding to said particular bit in said predetermined specific bit pattern wherein said detection window corresponding to said particular bit is divided into a plurality of regions, and the peak position is detected in one of said regions by operation on said memorized discrimination results; and display means for displaying a value representing the peak position distribution as an evaluation value indicating a signal modification by one of said recording compensation circuit and said equalizer.

4. A magnetic recording system, comprising:

a compensation circuit for modifying code inversion timings of a binary code stream to be recorded to produce a compensated binary code stream;

recording and reproducing means for recording the compensated binary code stream on a magnetic recording medium and for reproducing a signal by reading out a recorded signal from said magnetic recording medium;

an equalizer for equalizing a waveform of the reproduced signal;

peak detection means connected to the output of said equalizer for detecting peaks of the equalized signal;

discriminating means, connected to the output of said peak detection means, for discriminating whether a peak of the equalized signal exists within each of a plurality of repeatedly-generated detection windows to reproduce said binary code stream;

pattern detection means comprising memory means for memorizing discrimination results generated from said discriminating means, and generating means for generating a coincident signal each time a series of discrimination results sequentially generated from said discriminating means is coincident to a predetermined specific bit pattern;

peak distribution detecting means for obtaining a peak position distribution of peaks of said equalized signal indicating a particular bit of said predetermined specific bit pattern by analyzing and recording, each time said coincident signal is generated, a peak position of said equalized signal in a detecting window corresponding to said particular bit in said predetermined specific bit pattern, wherein said detection window corresponding to said particular bit is divided into a plurality of regions, and the peak position is detected in one of said regions by operation on said memorized discrimination results; and circuit constant controlling means for controlling one of a circuit constant of said recording compensation circuit and a circuit constant of said equalizer according to said peak position distribution obtained by said peak distribution detecting means.

5. A magnetic recording system as claimed in claim 4, further comprising a clock circuit for generating and outputting to the discriminating means a clock signal representative of the detection window, wherein the circuit constant controlling means further controls the clock circuit to control the phase of the clock circuit output signal.

* * * * *